(12) United States Patent
Zhang et al.

(10) Patent No.: US 12,114,180 B2
(45) Date of Patent: Oct. 8, 2024

(54) WIRELESS COMMUNICATION TECHNIQUES EMPLOYING BEAMFORMING BASED ON SPATIAL RELATIONSHIP TO HUMAN TISSUE

(71) Applicant: QUALCOMM Incorporated, San Diego, CA (US)

(72) Inventors: Danlu Zhang, San Diego, CA (US); Brian Momeyer, Escondido, CA (US); Brian Clarke Banister, San Diego, CA (US); Udara Fernando, San Diego, CA (US); Eyosias Yoseph Imana, Chula Vista, CA (US); Raghu Narayan Challa, San Diego, CA (US); Jiaying Pan, San Diego, CA (US); Xiaoxin Zhang, Sunnyvale, CA (US); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/648,789

(22) Filed: Jan. 24, 2022

(65) Prior Publication Data

US 2023/0239707 A1 Jul. 27, 2023

(51) Int. Cl.
*H04W 16/28* (2009.01)
*H04W 52/36* (2009.01)

(52) U.S. Cl.
CPC ......... *H04W 16/28* (2013.01); *H04W 52/367* (2013.01)

(58) Field of Classification Search
CPC ............................ H04W 16/28; H04W 52/367
See application file for complete search history.

(56) References Cited

U.S. PATENT DOCUMENTS

2020/0145090 A1 5/2020 Sun et al.

FOREIGN PATENT DOCUMENTS

| CN | 110633014 A | * 12/2019 | ............. A61B 3/113 |
| CN | 113397472 A | * 9/2021 | ........... A61B 3/0008 |

(Continued)

OTHER PUBLICATIONS

Cvetkovic N., et al., "Electric Field Distribution and SAR inside a Human Eye Exposed to VR Glasses", IET Microwaves, Antennas Propagation, The Institution of Engineering and Technology, United Kingdom, vol. 12, No. 14, Sep. 21, 2018, pp. 2234-2240, XP006107435.

(Continued)

*Primary Examiner* — Adam D Houston
(74) *Attorney, Agent, or Firm* — Arun Swain

(57) ABSTRACT

A method for wireless communication performed by a head-mounted user equipment (UE), the method includes determining a first spatial relationship between an eye of a human user of the head-mounted UE and physical transmission and reception ports of the head-mounted UE; based on the first spatial relationship, determining a second spatial relationship between a plurality of radio frequency (RF) beam directions of the head-mounted UE and the eye of the human user; selecting a first RF beam direction from among the plurality of RF beam directions based at least in part on the second spatial relationship with respect to the first RF beam direction; and transmitting or receiving RF radiation using a first RF beam conforming to the first RF beam direction.

30 Claims, 9 Drawing Sheets

(56) References Cited

FOREIGN PATENT DOCUMENTS

| EP | 3745608 A1 | | 12/2020 | |
|---|---|---|---|---|
| KR | 20190105532 A | * | 9/2019 | |
| KR | 20210046432 A | * | 4/2021 | |
| TW | 202023274 A | * | 6/2020 | ......... A61B 5/02405 |
| WO | WO-2018022523 A1 | * | 2/2018 | ............. A61B 34/25 |
| WO | WO2018100879 A1 | * | 6/2021 | |
| WO | WO-2021119212 A1 | * | 6/2021 | ......... G02B 27/0093 |

OTHER PUBLICATIONS

International Search Report and Written Opinion—PCT/US2023/010398—ISA/EPO—Mar. 29, 2023.

* cited by examiner

WIRELESS COMMUNICATION TECHNIQUES EMPLOYING BEAMFORMING BASED ON SPATIAL RELATIONSHIP TO HUMAN TISSUE

TECHNICAL FIELD

This application relates to wireless communication systems, and more particularly to beamforming based on spatial relationship to human tissues.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Extended reality (XR) continues to be a growing area of wireless communication usage. XR can include augmented reality (AR), mixed reality (MR) and/or virtual reality (VR) devices, systems, and/or communications. An XR device can be a mobile device (e.g. phone, tablet, glasses, watch, goggles, etc.) that facilitates XR wireless communications, including supporting wireless data exchanges with a server. Many XR applications support dynamic reconstruction of a three-dimensional (3D) environment and/or fusion of a real-world environment with a virtual environment. As a result, XR applications can require high quality video and/or audio data communications with low latency, which can cause significant power demands and data throughput on the XR devices. Also, as time goes on, users are becoming more aware of their exposure to radio frequency (RF) radiation, which may increase as usage time and data throughput increase for an XR device. As a result, there is a need to provide techniques to reduce RF radiation exposure for XR devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an additional aspect of the disclosure, a method for wireless communication performed by a head-mounted user equipment (UE), the method includes: determining a first spatial relationship between an eye of a human user of the head-mounted UE and physical transmission and reception ports of the head-mounted UE; based on the first spatial relationship, determining a second spatial relationship between a plurality of radio frequency (RF) beam directions of the head-mounted UE and the eye of the human user; selecting a first RF beam direction from among the plurality of RF beam directions based at least in part on the second spatial relationship with respect to the first RF beam direction; and transmitting or receiving RF radiation using a first RF beam conforming to the first RF beam direction.

In an additional aspect of the disclosure, an extended reality (XR) device includes: a modem configured to transmit and receive radio frequency (RF) signals; and a processor configured to control the modem and to perform a process including: determining a spatial relationship between a first lobe within a beam pattern and tissue of a human user of the XR device; selecting a direction for the beam pattern based on the spatial relationship; and transmitting the RF signals using the beam pattern in the direction.

In an additional aspect of the disclosure, an extended reality (XR) device includes: means for determining a spatial relationship between a side lobe or a back lobe of a beam pattern and a retina of a human user of the XR device; means for determining potential radiation exposure from the side lobe or the back lobe to the retina for a plurality of directions of the beam pattern; means for selecting a first direction of the beam pattern based on the potential radiation exposure; and means for transmitting data using the beam pattern according to the first direction in communication with a base station (BS) serving the XR device.

In an additional aspect of the disclosure, a non-transitory computer-readable medium having program code recorded thereon for wireless communication by a wireless communication device, the program code including: code for processing information regarding a physical position of an antenna array of the wireless communication device, information regarding beam pattern direction of the antenna array, and information regarding a position of tissues of a human user, wherein the processing provides information indicating a spatial relationship between the tissues of the human user and a side lobe or a back lobe of a beam pattern for multiple directions; code for determining potential radiation exposure by the side lobe or the back lobe to the tissues of the human user for each of the multiple directions; code for selecting a first direction of the multiple directions for the side lobe or the back lobe, the first direction being selected according to at least a first constraint to maintain connectivity with a base station (BS) serving the wireless communication device and at least a second constraint to minimize radiation exposure to the tissues of the human user; and code for causing a transceiver of the wireless communication device to communicate data to the BS using the beam pattern and according to the first direction.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
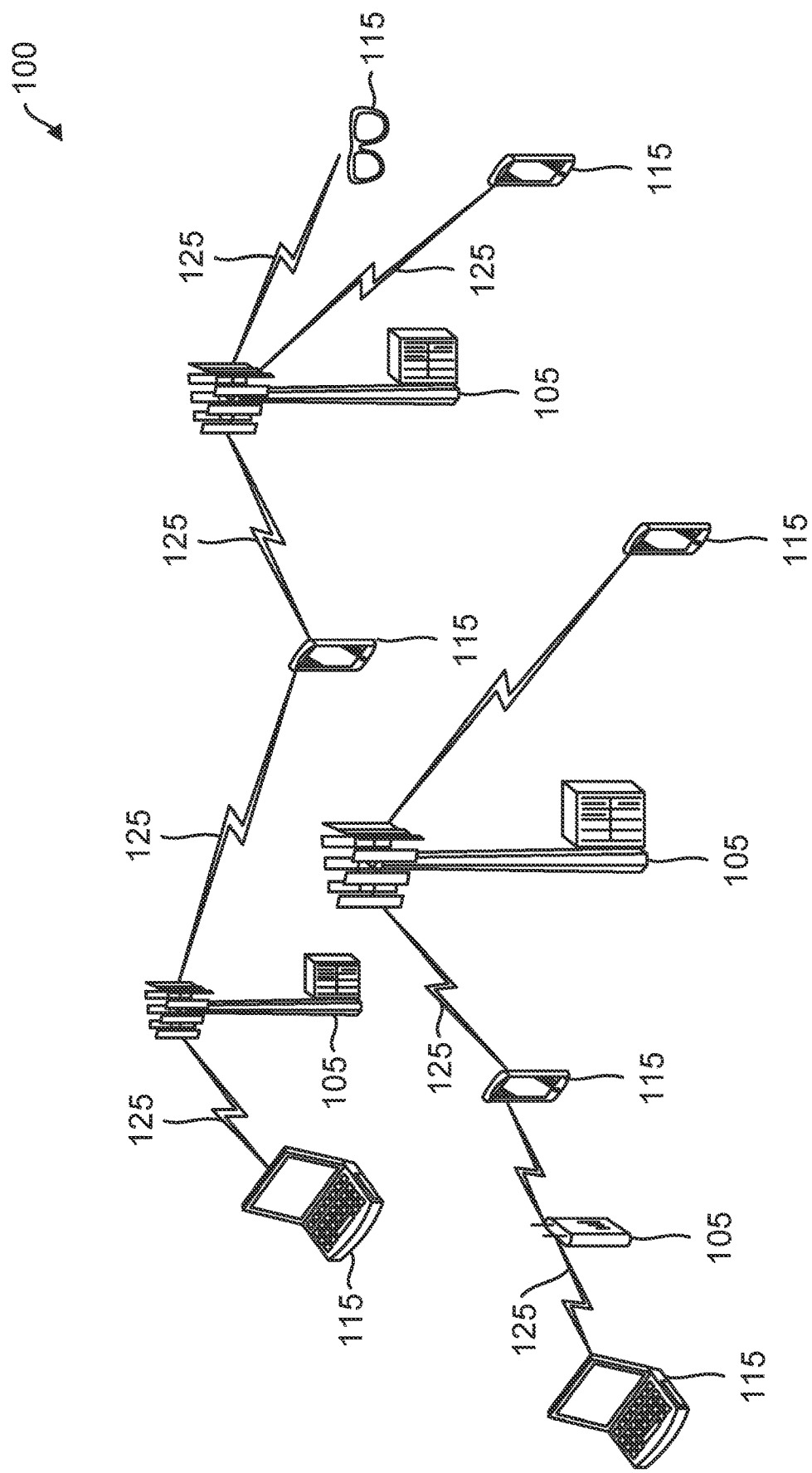
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Extended reality (XR) continues to be a growing area of wireless communication usage. XR can include augmented reality (AR), mixed reality (MR) and/or virtual reality (VR) devices, systems, and/or communications. An XR device can be a mobile device (e.g. phone, tablet, glasses, watch, goggles, etc.) that facilitates XR wireless communications, including supporting wireless data exchanges with a server via a network, such as a NR network and/or a Wireless Fidelity (Wi-Fi) network. Many XR applications support dynamic reconstruction of a three-dimensional (3D) environment and/or fusion of a real-world environment with a virtual environment.

Various Embodiments include techniques to use beamforming to reduce radiation exposure to parts of the human body. For instance, when using an XR headset, a user's eyes and brain may be physically close to antennas of the headset. When the antennas of the headset transmit radiofrequency (RF) radiation, some of that radiation may travel through the tissues of the human user and be absorbed by the tissues of the human user. While ordinary RF communication photons are generally considered safe in the doses in which they are normally encountered, there is growing concern that exposure over time and, specifically, exposure to directed millimeter wave beams may have the potential to cause damage to cells in sensitive tissues, such as those found in human eyes and brains.

Therefore, various embodiments may track a spatial relationship between the tissues of the human user and the directed beams from a wearable XR device. The wearable XR device may then use that spatial relationship to perform beamforming in ways that balance base station connectivity with the amount of radiation that is transmitted through the human tissues. In one example, a particular antenna array in an XR device may have multiple beams—a main beam as well as other beams, such as side lobes and a back lobe. In many instances, the main beam will be directed away from the head of the human user, though a back lobe or a side lobe may transmit radiation through the head of the human user. The wearable XR device may use its information regarding the spatial relationship between the tissues of the human user and the antenna beams to adjust power and/or direction of the main beam, back lobe, and side lobes so that no one lobe is directly pointed at identified sensitive tissue, such as a retina.

In various examples, beamforming may be dynamic, so that as a user moves around, the base station (BS) and the XR device (a user equipment or UE) may communicate to configure the UE to use certain transmit beams. In other words, over time, beams and direction of beams may change. Accordingly, various embodiments may perform beamforming techniques to reduce exposure of human tissues each time a direction of a beam or selection of a beam changes.

According to one example, a head-mounted UE, such as an XR device, determines a first spatial relationship between a tissue of a human user and physical transmission and reception ports of the UE. For instance, such information may be built into a standalone head-mounted XR device. In an instance in which the XR device includes a smart phone plug-in, the spatial relationship of the antennas to the smart phone may be built into the smart phone. Such information may be gathered either by an operating system of the XR device, a modem chipset of the XR device, or a XR application running on the XR device. In the instance in which the XR device includes a smart phone plug-in, the XR device may combine knowledge of the smart phone's dimensions as well as knowledge of the dimensions of the XR device to approximate the spatial relationship between the tissue of the human user and the physical transmission and reception ports (e.g., antennas) of the smart phone.

The example continues in which the XR device determines a second spatial relationship between a plurality of RF beam directions and the tissue of the human user. In other words, once a spatial relationship between antennas and the human tissue is known, then a spatial relationship between the human tissue and beam directions may be derived. Information regarding beam direction may come from a modem chipset, an operating system of the XR device, and/or the like. The information regarding beam direction may be updated periodically, continuously, or at other appropriate intervals so that it is current, as it is expected that beam direction may be dynamic.

Continuing with the example, the XR device may select a first RF beam direction from among the plurality of RF beam directions based at least in part on the second spatial relationship. In other words, the beam direction may be selected to balance connectivity with the BS and radiation exposure of the human tissue. In some instances it may not be possible to avoid exposure of the human tissue entirely, though it may be possible to reduce the exposure by changing a power level and/or a direction of a beam in use. As a result, a back lobe or side lobe may be directed away from a sensitive tissue, such as a retina, while still preserving communication with the BS.

As explained in more detail below, the second spatial relationship may be derived at least in part from eye movement and position sensors of the XR device. For instance, the eye movement and position sensors may detect a distance of the eye from a particular part of the XR device and an angle of the eye at a particular moment in time. As angle of the eye may change, so may the spatial relationship. In one example, as the angle of the eye changes, beamforming techniques may be used to avoid direct exposure of the retina through the pupil to a lobe. Further, some embodiments may include a finite number of beams that may be selected, whereas other embodiments may be able to steer a single beam within a range of degrees, and other embodiments may provide a combination of the two.

Aspects of the present disclosure can provide several benefits. For example, embodiments that seek to balance BS connectivity with concerns for maximum power exposure (MPE) of human tissues may seek to address concerns about radiation exposure while at the same time providing data throughput. As a result, users may feel more at ease using a particular XR headset that they know seeks to reduce radiation exposure to sensitive tissues, such as eyes and brain tissues. Furthermore, when such radiation exposure is reduced, it can be assumed that tissue damage that might otherwise be attributable to radiation exposure may be reduced as well. Additionally, by adjusting beams to maintain connectivity to the BS, the XR headset may still provide acceptable performance for many applications.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt 125 (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115.

The network 100 may also support communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide a ultra-reliable low latency communications (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). ABS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

One or more of the UEs 115 may include an XR device, either as a stand-alone XR device or a plug-in XR headset that incorporates a separate mobile device to provide the computation and display. In any event, the XR device embodied as a UE 115 may communicate with one or more of the BSs 105 as discussed above. Communications in NR may take place in various frequency ranges. A first frequency range, referred to as FR1, spans from 410 MHz to 7125 MHz. A second frequency range, referred to as FR2, spans from 24.25 GHz to 52.6 GHz, and is sometimes referred to as millimeter wave. Of course, various implementations of NR may expand or reduce the frequencies in use, and any particular BS may only employ some of the spectra within a given frequency range.

One advantage of communications using FR2 is that millimeter wave RF signals are amenable to beamforming and beam steering, at least more so than the RF signals of FR1. However, as beams become narrower to increase directivity, the radiation exposure of human tissue may be expected to increase. This may be especially true for head-mounted XR devices, which sit close to a human user's eyes and brain and may cause directed millimeter wave exposure to small portions of tissue at a given time. It is currently under investigation whether millimeter wave exposure from directed beams may cause tissue damage over time. Therefore, various embodiments use the beamforming and beam steering techniques discussed herein to reduce direct exposure of a sensitive tissue to a RF beam.

Figure 2:
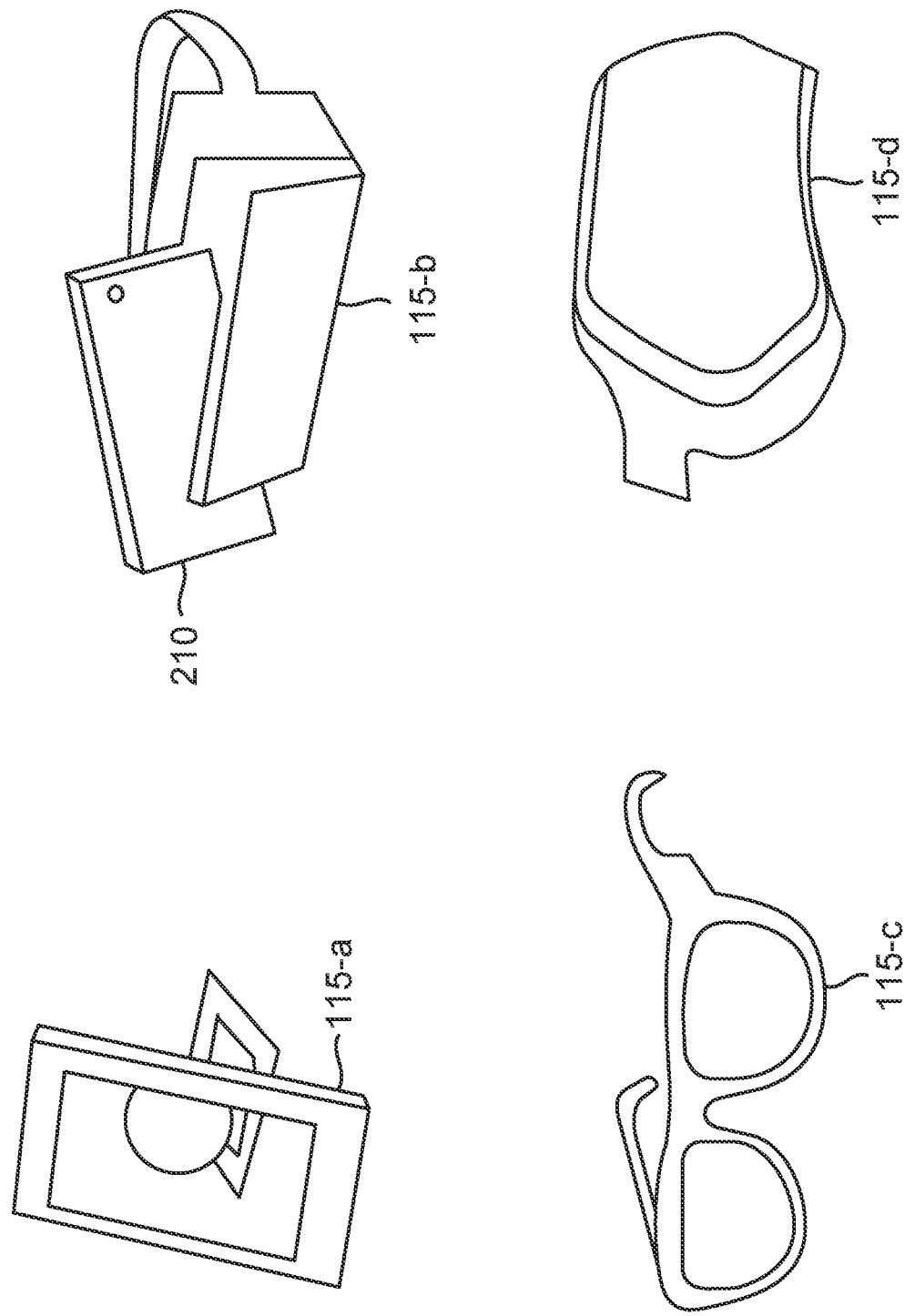
FIG. 2 illustrates example extended reality (XR) devices according to embodiments of the present disclosure.

The UE 115 may be an extended reality (XR) device, including without limitation an augmented reality (AR) device, a mixed reality (MR) device, a virtual reality (VR) device, a head mounted device (HMD), a wearable device, etc. In this regard, FIG. 2 illustrates examples of XR devices 200 according to some aspects of the present disclosure. In particular, the illustrated XR devices 200 include (1) an AR and/or MR smartphone, tablet, or portable console 115-*a*; (2) an AR, MR, and/or VR wearable system that includes a smartphone, tablet, or portable console along with a mounting structure (e.g., head band configured to received and/or couple with the smartphone, tablet, or portable console); (3) AR and/or MR smart glasses 115-*c*; and (4) VR goggles 115-*d*. It is understood that aspects of the present disclosure are generally suitable for use with any type of XR devices, not only those shown in FIG. 2. The XR device 115-*b* includes a plug-in device, which plugs into a separate UE 210 that fits within a housing of the headset. Thus, the XR device 115-*b* may include a tethering connection to the other UE 210, such as a smart phone, a tablet computer, or the like. Accordingly, an XR device may connect to another device using a universal serial bus (USB) link, a Bluetooth link, a Wi-Fi link, a 5G sidelink, or other suitable connection. The various beamforming techniques discussed herein may be applied to any one of the XR devices 200 of FIG. 2.

Each of the devices of FIG. 2 may include one or more antennas therein that provide transmission and reception for communicating with an associated BS 105. In the examples of XR devices 115-*a*, 115-*c*, 115-*d*, antennas may be integrated within the housing of the devices. In the example of device 115-*b*, one or more antennas may be integrated within the UE 210 instead of or in addition to antennas integrated within the housing of the device 115-*b*.

Figure 3:
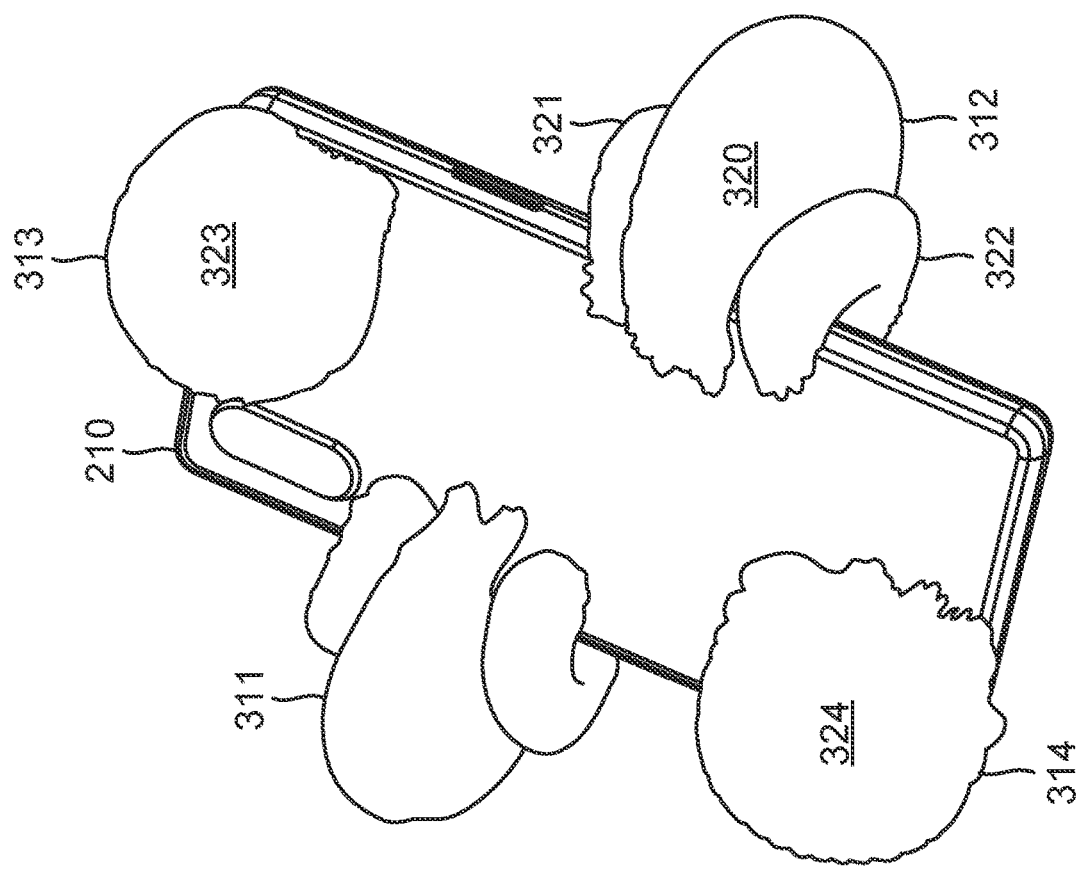
FIG. 3 illustrates an example user equipment that may be adapted for XR and having a plurality of radio frequency (RF) beams according to some embodiments of the present disclosure.
Figure 3:
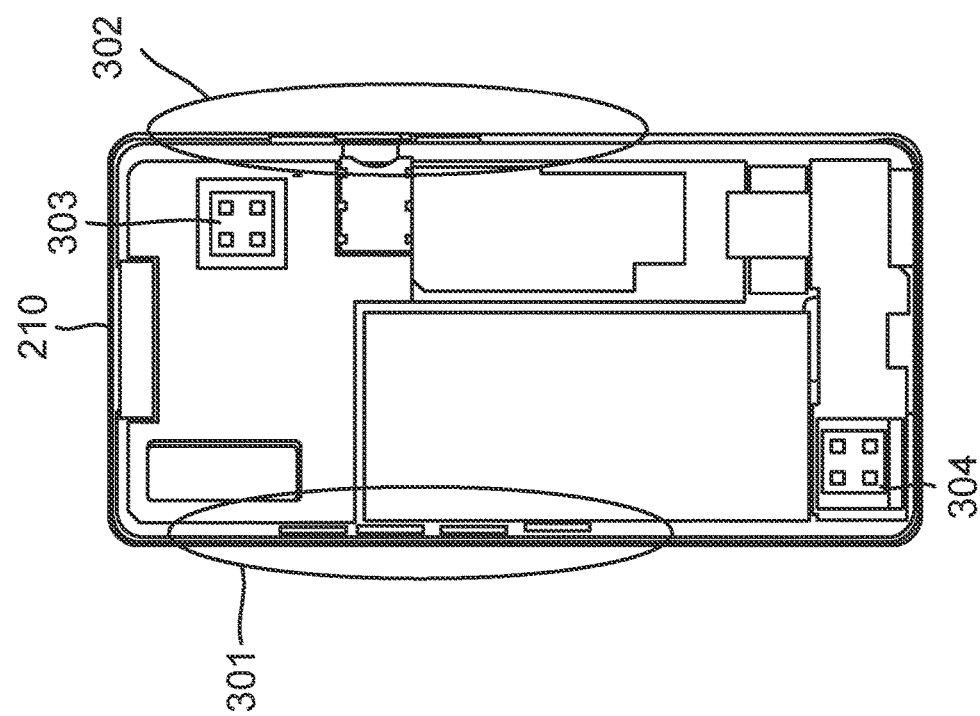

Each of the antennas (or antenna arrays) associated with a given XR device may be expected to have a particular pattern. One example is shown with respect to FIG. 3. FIG. 3 is an illustration of the example UE 210 having example beams and lobes, according to one embodiment.

FIG. 3 includes a first top-down view of UE 210, and the right-hand side view is a perspective view of UE 210. Looking at the top-down view first, it provides an illustration of example internal components, including antennas arrays 301-304. Antenna arrays 301 and 302 are located on the sides of UE 210, and they both include multiple antennas. Antenna arrays 301 and 302 are sometimes referred to as slot arrays, as they include multiple antennas arranged linearly. Antenna arrays 303, 304 are sometimes referred to as chip arrays, each one includes multiple antennas laid out in a two dimensional array within a plane.

The antenna arrays 301, 302 are associated with the beam patterns 311, 312. Similarly, the antenna arrays 303, 304 are associated with the beam patterns 313, 314. Real-world antenna arrays, such as those shown in FIG. 3 may each provide a main lobe for communication as well as other lobes that are a result of the physics of the particular array. Looking at beam pattern 312 first, it includes a main beam 320 as well as two side lobes 321, 322. And although not shown in FIG. 3, beam pattern 312 may further include a back lobe that projects into the plane of the UE 210. Beam pattern 311 is understood to be similar to beam pattern 312. Now looking at beam patterns 313, 314, they are shown having main lobes 323, 324 that protrude perpendicular to the back surface of the UE 210. Not shown in FIG. 3 are back-lobes of each of the beam patterns 313, 314 that project 180° from their respective main lobes 323, 324. The main lobes 323, 324 are shown protruding from the back of the phone, whereas their associated back lobes (not shown) may protrude out from the screen (not shown) of the UE 210 UE 210, which means that a human user having the screen very close to their eyes may experience significant RF energy from those back lobes.

Of course, the illustration in FIG. 3 is simply an example of one UE 210, which may be physically plugged into a housing of an XR device, such as device 115-*b*. The other XR devices 115-*a*, 115-*c*, 115-*d* may include their own antenna arrays placed in any appropriate manner within the housing of their respective XR devices. It is expected that those antenna arrays (not shown) within the other devices 115-*a*, 115-*c*, 115-*d* may also have side lobes and back lobes and may have beam patterns different from or similar to those shown in FIG. 3.

Figure 4:
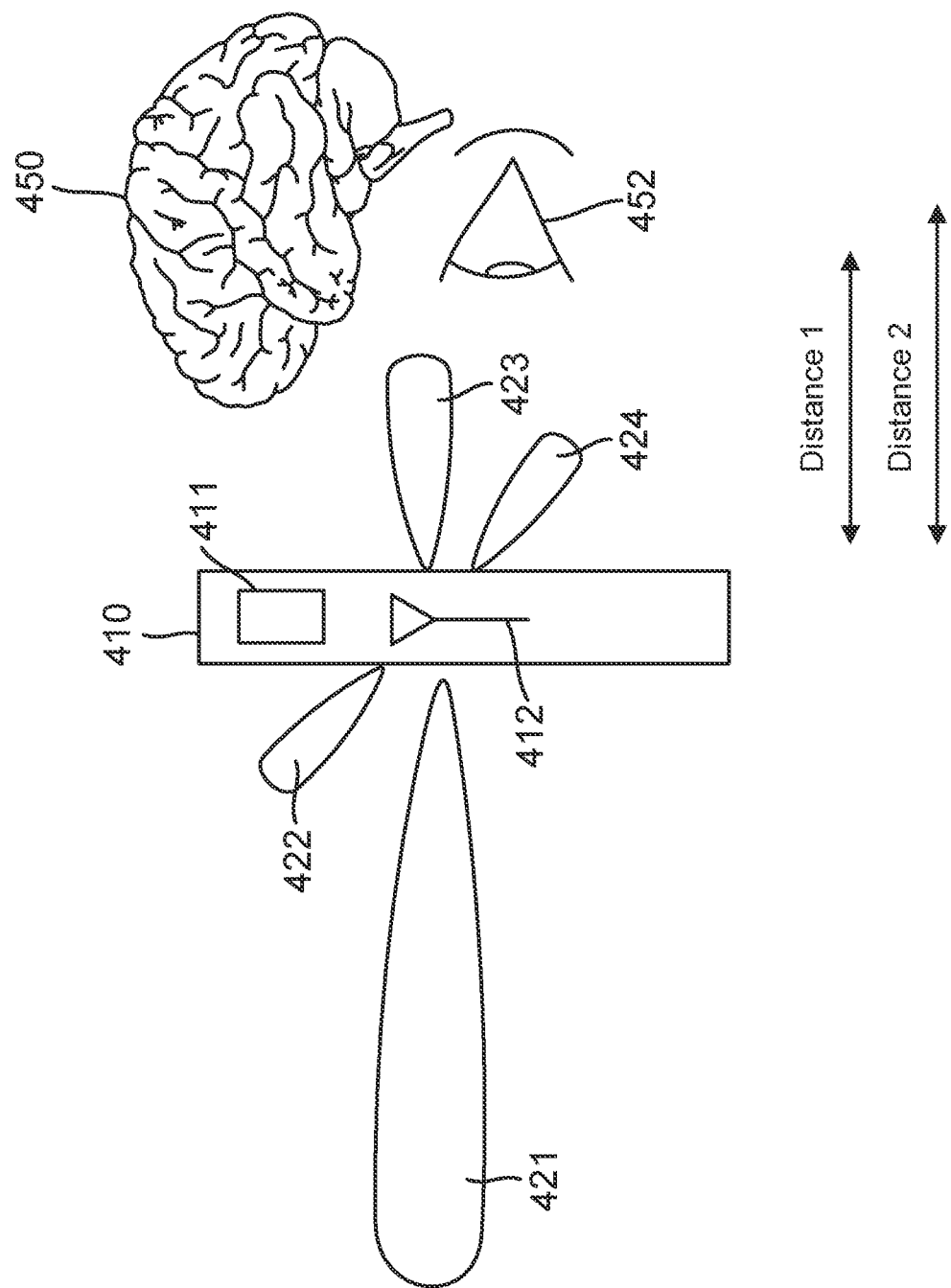
FIG. 4 illustrates an example spatial relationship between an XR device and tissues of a human user according to some embodiments of the present disclosure.

FIG. 4 is a simplified illustration of a beamforming technique, according to one implementation. XR device 410 is shown having a spatial relationship to a brain 450 and an eye 452 of an end user. Specifically, there is a distance (distance 1) between antenna array 412 of the XR device 410 and brain 450 and another distance (distance 2) between antenna array 412 and eye 452. The spatial relationship, including distance 1 and distance 2, is based on the physical properties of XR device 410 as well as the positioning of the user's head with respect to antenna array 412. XR device 410 includes spatial sensor 411, which may be an optical sensor or other appropriate sensor, that is configured to determine the position of the user's head. Specifically, spatial sensor 411 may include eye tracking capability to determine a position and angular direction of eye 452 as well as position of the user's forehead. Distance 1 and distance 2 are for example only, and the spatial relationships may include two dimensional and three dimensional relationships as well, where those two dimensional and three dimensional relationships may be derived from information of spatial sensor 411.

The spatial sensor 411 may include a communication path with an operating system of the XR device 410, with a modem chipset that controls antenna array 412, and/or an XR application running on the operating system of the XR device 410. For instance, the operating system of the XR device 410 itself may include information regarding the physical placement of antenna array 412 within the housing of the XR device 410, and it may receive information either directly from the spatial sensor 411 or from an application that receives information from spatial sensor 411. The operating system may then combine the information regarding the physical placement of antenna 412 with spatial information from spatial sensor 411 to determine distance 1 and distance 2. In another example, an XR application may receive the information regarding the physical placement of antenna 412 as well as information from the spatial sensor 411 and combine those two pieces of information to determine distance 1 and distance 2. Communication between the different components may be defined using certain application programming interfaces (APIs). The scope of implementations is not limited to any particular component (e.g., operating system, modem chipset, application) determining the spatial relationship regarding the physical properties of XR device 410 and the position of the user's head with respect to antenna array 412.

FIG. 4 also illustrates radiation emanating from antenna array 412. The main lobe is shown as item 421, and the back lobe 423 transmits 180° from the main beam 421. Side lobes 422, 424 are present as well. It should be noted that the beam pattern illustrated in FIG. 4 is for example only, as the scope of implementations is not limited to any particular beam pattern. In the example of FIG. 4, it is back lobe 423 and side lobe 424 that provide the potential for the most radiation exposure to brain 450 and eye 452. As discussed herein, various embodiments may change the power and/or the angle of the beam pattern to balance connectivity with radiation exposure of the human tissues.

For instance, the beam pattern of FIG. 4 may change over time so the different beams are selected or that different angles for main beam 421 are selected. With the spatial relationship of antenna array 412 to the human tissues being known, spatial relationships between the individual beams and lobes and the human tissues may be derived. For instance, the operating system of XR device 410 and/or its modem chipset include information regarding a beam direction, and the spatial relationship between the individual beams and lobes in the human tissues may then be derived by one or more of the operating system, the modem chipset, and/or the XR application running on the XR device 410. As the beam pattern changes are the angle changes, the spatial relationship may be re-derived as appropriate. The beam and/or the angle may then be changed to avoid tissue exposure while still providing connectivity.

Figure 5:
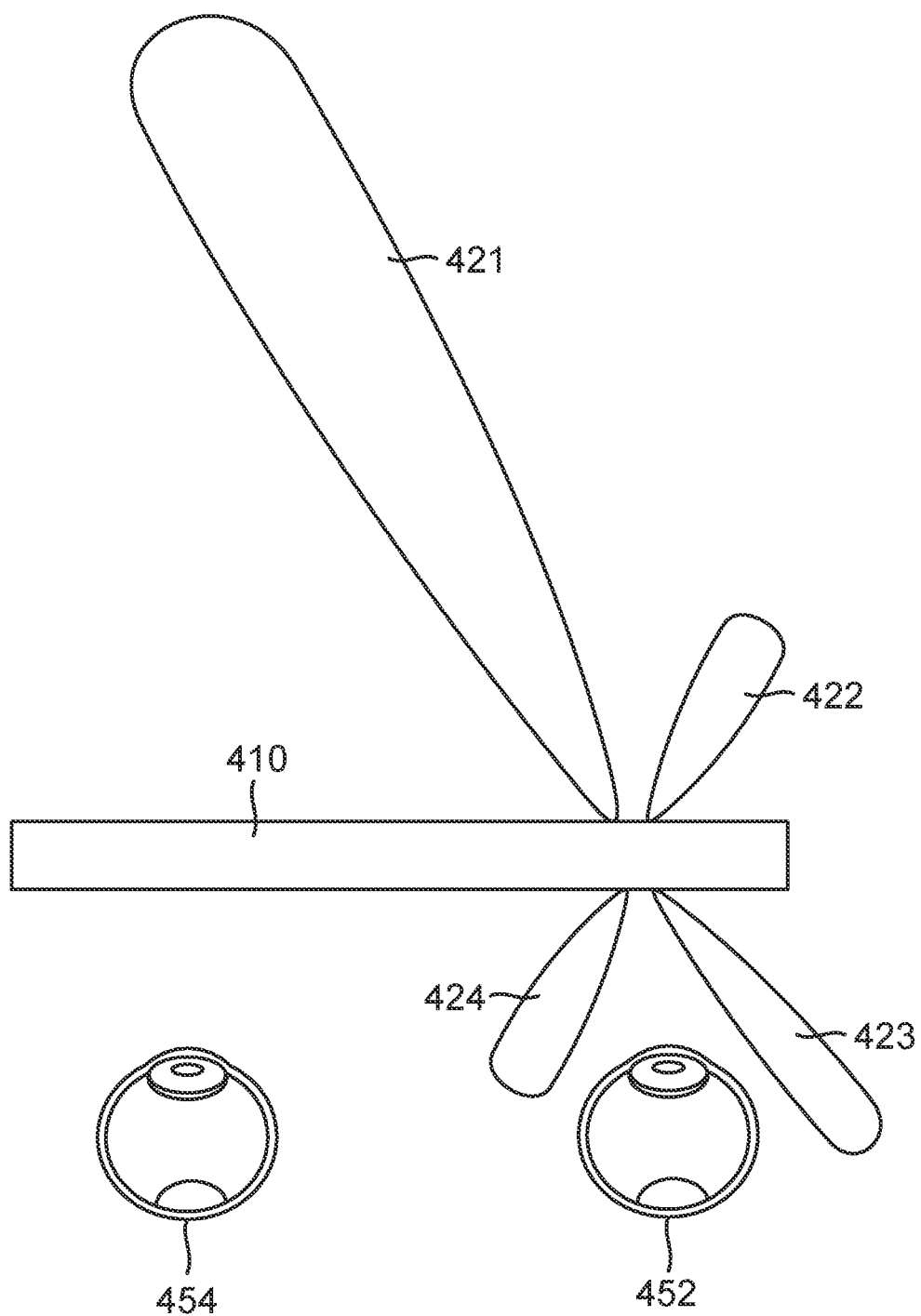
FIGS. 5-6 illustrate example spatial relationships between an XR device and tissues of a human user according to some embodiments of the present disclosure.

FIG. 5 builds on FIG. 4 by showing a top-down view of the side illustration of FIG. 4. FIG. 5 adds another eye 454 for ease of context and omits showing brain 450 to simplify the illustration. However, it is understood that techniques for avoiding exposure of eye 452 may be applied in a similar manner to avoid exposure of tissue of the brain 450. Also, it is understood that techniques for avoiding exposure of eye 452 may be applied in the same manner to avoid exposure of eye 454. Furthermore, while only one antenna array 412 is shown in FIGS. 4-5, the same or similar techniques may be used to perform beamforming for other antenna arrays (not shown) of XR device 410.

In FIG. 5, neither back lobe 423 nor side lobe 424 directly impact the tissues of the eye 452. However, as the beam pattern changes, it is conceivable that back lobe 423 or side lobe 424 may directly impact the tissues of eye 452. In fact, with enough angle or beam change, side lobe 422 may also may directly impact the tissues of eye 452.

Figure 6:
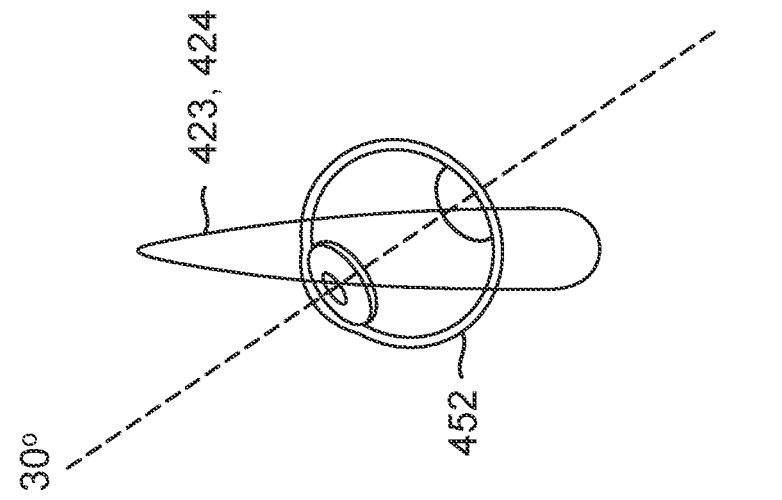
Figure 6:
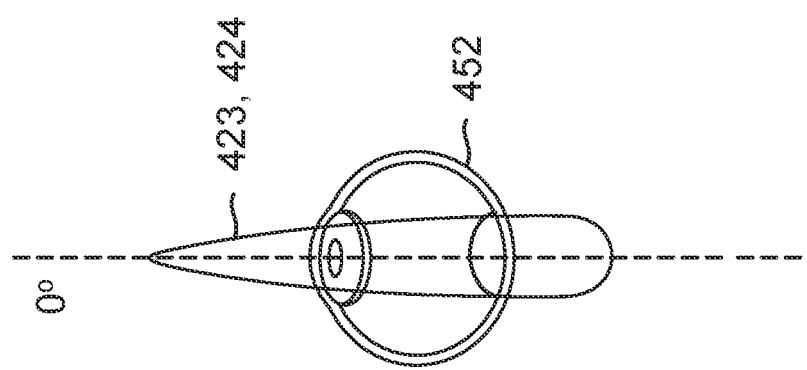
Figure 6:
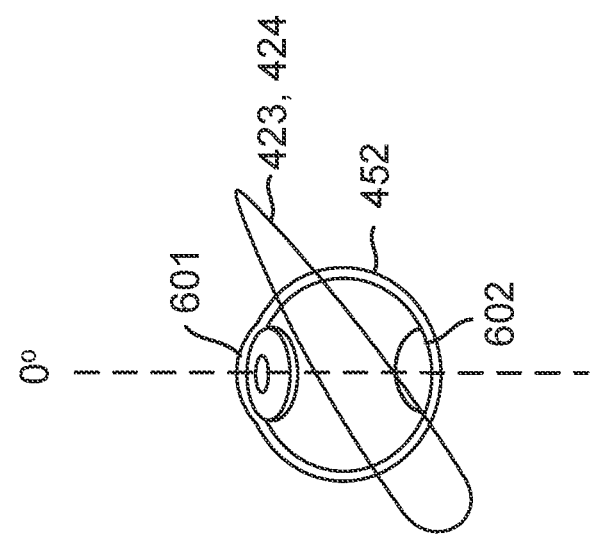

Some embodiments also take into account exposure of the retina of the eye when selecting an RF beam direction in order to avoid or at least reduce direct exposure of the retina of the eye through the pupil of the eye to a beam or lobe. FIG. 6 is an illustration of a relationship of the eye 452 with respect to a beam 423, 424, according to one implementation.

FIG. 6 shows three different scenarios from left to right. Beginning with the leftmost scenario, the eye 452 is looking straight ahead, otherwise shown as 0°. The pupil 601 lets light into the eye which impacts retina 602. The lobes 423/424 impact the eye 452, but do not directly impact the retina 602.

Moving to the middle scenario, the eye 452 is looking straight ahead, and the lobes 423/424 are aligned with the pupil 601 to directly impact the retina 602. The difference between the leftmost scenario and the middle scenario is the angle of lobes 423/424. Now moving to the rightmost scenario, the eye is not looking straight ahead, but is rather pointed to the left at 30°. The angle that the eye is pointed to avoids direct exposure of the retina 602 to the lobes 423/424 through the pupil 601.

The leftmost scenario and the rightmost scenario include RF exposure to the tissues of the eye, but they do not include direct exposure of the retina through the pupil to the lobes 423, 424. In many scenarios, it would be preferable for the lobes 423/424 to avoid the eye 452 altogether, though that may be unavoidable in some instances, depending on beam shape and position of antenna array with respect to eye 452. The middle scenario is intended to be avoided, or at least reduced, using the beamforming techniques described herein. Specifically, the angular position of the eye 452 may be gleaned from the spatial sensor 411 (FIG. 4), and that information may be used to select a particular beam or select a direction of the beam so as to avoid direct exposure through the pupil. During an XR experience, a user's eyes may be expected to change direction from time to time, depending upon the content that is being presented. Accordingly, the direction of the beam may be changed from time to time, depending upon the position of the user's eyes to avoid or at least reduce direct exposure to the RF radiation through the pupil.

As noted above, the middle scenario of direct exposure through the pupil may be unavoidable in some instances. Accordingly, some embodiments provide for change in power of the beam instead of or in addition to setting a beam direction. Thus, when tissue of the eye is exposed to a lobe of radiation, including instances when the exposure is directly through the pupil to the retina, transmission power may be reduced to maintain connectivity to the BS while reducing RF radiation exposure. Transmission power may then be increased subsequently when a direction of the beam changes and tissues of the eyes are less exposed. Such techniques may be performed over and over during a given XR experience.

Although not illustrated in FIG. 6, it is understood that the hardware of an XR device may provide for some level of radiation attenuation between a transmitting antenna array and tissues of the human user. Such attenuation may depend upon the spatial placement of the antenna array as well as the placement of materials and the compositions of the materials themselves in the XR device. Attenuation information may be stored in the XR device itself and then combined with the spatial relationship information discussed above to further determine beamforming. For instance, when a particular side lobe might otherwise be expected to cause excess radiation exposure to human tissues, but that side lobe might be attenuated by hardware of the XR device, the system may take that attenuation into account and either change a direction of the beam or not change the direction of the beam in response thereto.

Looking back at FIG. 4, it is possible that placement of the antenna array 412 within the XR device 410 may not be saved to memory within XR device 410 or may be inaccessible to the application, operating system, or modem chipset. In such an instance, the beamforming technique may rely on approximations. For instance, rather than using a distance from human tissue to the antenna array, the sensor 411 may use some other relationship, such as distance of the human tissue to the sensor itself, distance of the human tissue to a center of the display screen, and/or distance of the human tissue to some other point within the XR device. Using approximate spatial relationships may provide acceptable performance in some applications. Additionally, the XR device may provide adjustable dimensions, such as the ability to move a display screen up or down or closer and further with respect to the user's eyes. In such instances, the beamforming technique may take into account such dimensional changes by for example being collected by an XR application and then passed to the operating system and/or modem chipset as appropriate.

Some implementations may also include setting a beam direction and/or power during reception by the XR device. While in many instances it will be expected that radiation from transmission will be more relevant to tissue exposure, it is also expected that narrower beams for DL may also provide radiation exposure. In such instances, the XR device may use the information regarding spatial relationships to negotiate with the BS to use certain beams on UL and on DL that minimize undesirable RF exposure as appropriate.

Moreover, while the embodiment of FIG. 4 includes a sensor 411, positional information, especially with respect to an angular position of the eye, may be collected from other sources instead of or in addition to the sensor 411. For instance, it is expected that some visual content of the XR experience may be understood to cause a human user to shift the focus of the eye in a particular direction. The XR application may be able to track such changes and infer an angular position of the eye therefrom. The angular position may be used as described above for beamforming purposes to reduce or avoid RF radiation exposure to the retina or other tissues.

While the embodiments described herein specifically refer to millimeter wave radiation (e.g., FR2 in NR), it is understood that the principles may be adapted to radiation of any wavelength or protocol. For instance, wireless fidelity (Wi-Fi, as defined by IEEE 802.11) may use protocols similar to NR and additional frequency bands. In some implementations, it would be expected that an antenna array of the XR device may communicate with a network through a Wi-Fi access point, which is a type of BS. Some Wi-Fi standards allow for beamforming, and the principles described herein may be applied to Wi-Fi beamforming as well. Furthermore, in the future, it is expected that other frequency bands may be opened for use in addition to FR1, FR2, and bands used by Wi-Fi. As frequency increases, the physics may allow for narrower beams, and as a frequency decreases the physics may allow only wider beams. In any event, shape of beams may be taken into account when selecting a beam direction and/or power level to avoid or at least reduce exposure of human tissues to lobes of radiation.

Figure 7:
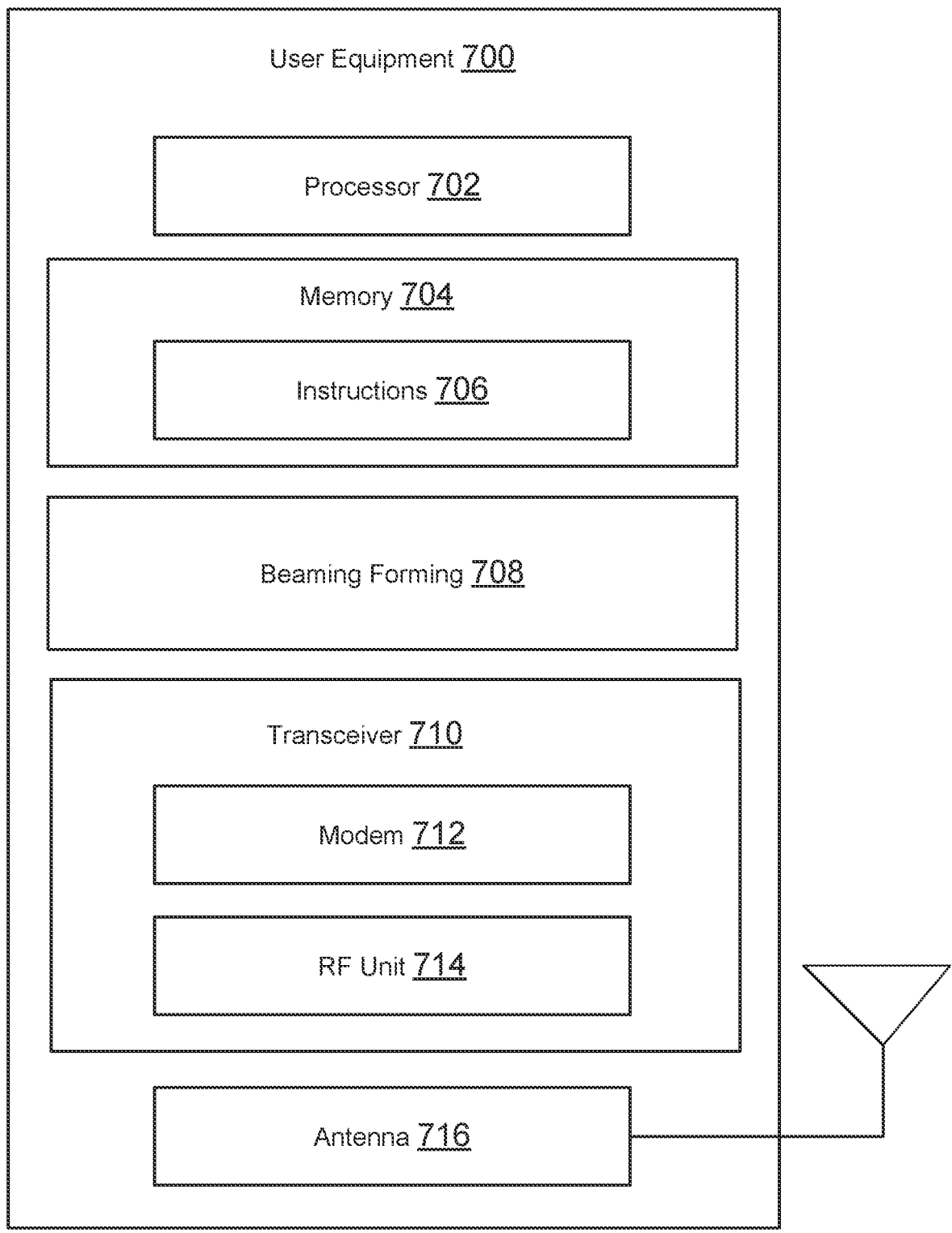
FIG. 7 illustrates an example user equipment that may be adapted for XR according to some embodiments of the present disclosure.

FIG. 7 is a block diagram of an exemplary UE 700 according to aspects of the present disclosure. The UE 700 may be a UE 115 (as discussed above in FIG. 1) and/or an XR device 210/410 (as discussed above in FIGS. 2-4). As shown, the UE 700 may include a processor 702, a memory 704, a beamforming module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 1-6 and 9. Instructions 706 may also be referred to as program code. The program code may be for causing a wireless communication device (or specific component(s) of the wireless communication device) to perform these operations, for example by causing one or more processors (such as processor 702) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beamforming module 708 may be implemented via hardware, software, or combinations thereof. For example, beamforming module 708 may be implemented as a processor, circuit, and/or instructions 706 stored in the memory 704 and executed by the processor 702. In some examples, the beamforming module 708 can be integrated within the modem subsystem 712. For example, the beamforming module 708 can be implemented by a combination of software components (e.g., executed by a DSP or a general processor) and hardware components (e.g., logic gates and circuitry) within the modem subsystem 712 or within an operating system running on processor 702.

The beamforming module 708 may be used for various aspects of the present disclosure, for example, aspects of FIGS. 1-6 and 9. The beamforming module 708 is configured to communicate with other components of the UE 700 to determine spatial relationships of the XR device to human tissue as well as spatial relationships of beams and lobes to the human tissue and then to set a beam angle and/or power appropriate for a given scenario, including to reduce or eliminate radiation exposure to sensitive tissues. For instance, the beamforming module 708 may receive some spatial information from an XR app running on processor 702 and/or spatial information stored in memory 704. Beamforming module 708 may combine or process that information to determine appropriate beam directions, beam selections, and or beam power settings. Communication between the beamforming module 708 and other components may be through APIs or other appropriate techniques. Beamforming module 708 may then cause the modem 712 to implement desired beam characteristics.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704, and/or the beamforming module 708 according to a modulation and coding scheme (MCS) (e.g., a low-density parity check (LDPC) coding scheme, a turbo coding scheme, a convolutional coding scheme, a digital beamforming scheme, etc.). The RF unit 714 may be configured to process (e.g., perform analog to digital conversion or digital to analog conversion, etc.) modulated/encoded data (e.g., UL control information, UL data) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data (e.g., data packets or, more generally, data messages that may contain one or more data packets and other information) to the antennas 716 for transmission to one or more other devices. Antennas 716 may include antenna arrays that may be controlled for directional beamforming by, e.g., controlling phase shifts among multiple antenna elements under control of the transceiver 710.

The antennas 716 may further receive data messages transmitted from other devices. The antennas 716 may provide the received data messages for processing and/or demodulation at the transceiver 710. The transceiver 710 may provide the demodulated and decoded data (e.g., PDCCH signals, radio resource control (RRC) signals, media access control (MAC) control element (CE) signals, PDSCH signals, DL/UL scheduling grants, DL data, etc.) to the beamforming module 708 for processing. The antennas 716 may include multiple antennas of similar or different designs in order to sustain multiple transmission links. The RF unit 714 may configure the antennas 716.

In an embodiment, the UE 700 can include multiple transceivers 710 implementing different RATs (e.g., NR and LTE). In an embodiment, the UE 700 can include a single transceiver 710 implementing multiple RATs (e.g., NR and LTE). In an embodiment, the transceiver 710 can include various components, where different combinations of components can implement different RATs.

Figure 8:
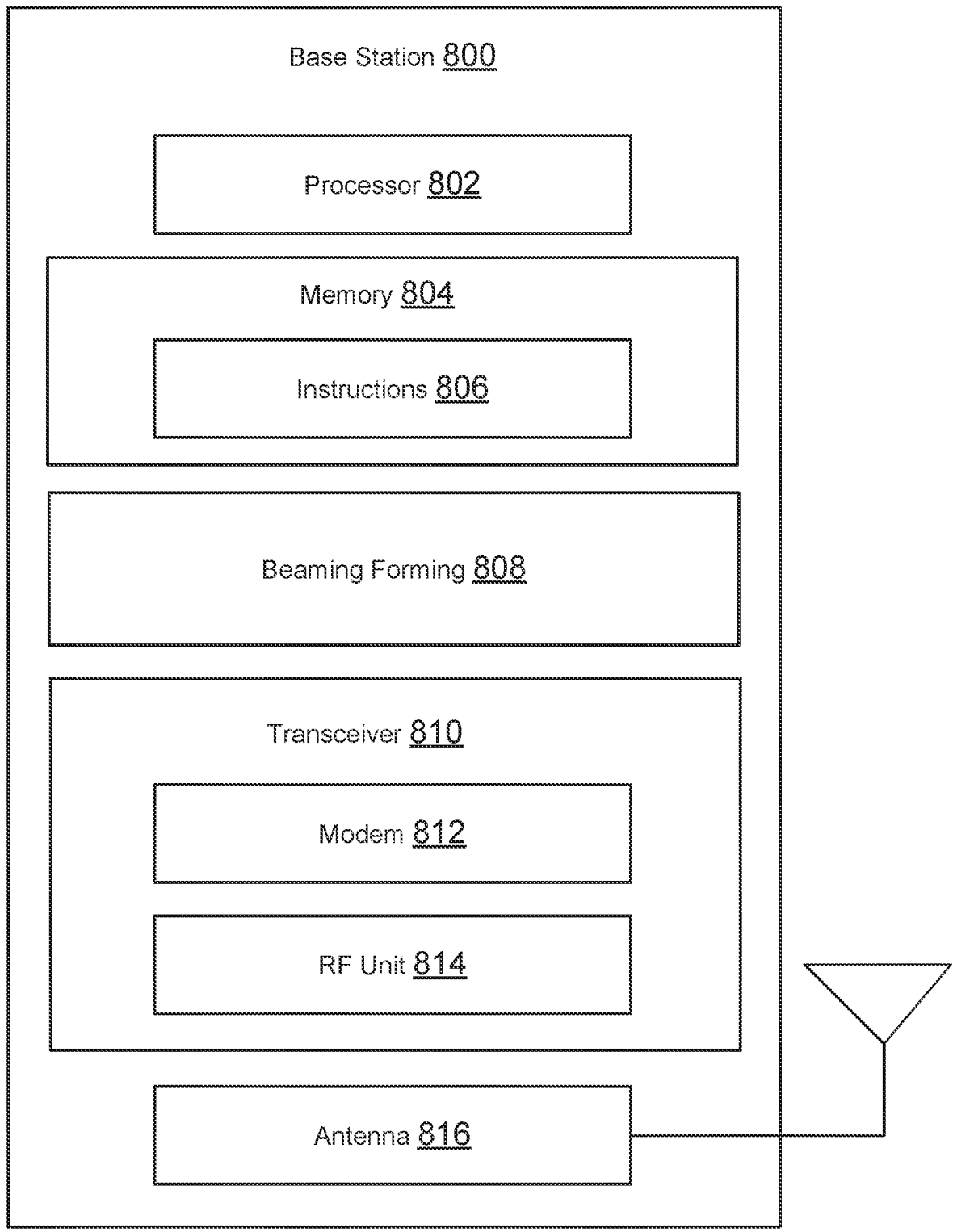
FIG. 8 illustrates an example base station that may communicate with an XR device according to some embodiments of the present disclosure.

FIG. 8 is a block diagram of an exemplary BS 800 according to aspects of the present disclosure. The BS 800 may be a BS 105 as discussed above in FIG. 1. As shown, the BS 800 may include a processor 802, a memory 804, a beamforming module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIG. 1. Instructions 806 may also be referred to as code, which may be interpreted broadly to include any type of computer-readable statement(s) as discussed above with respect to FIG. 5.

The beamforming module 808 may be implemented via hardware, software, or combinations thereof. For example, the beamforming module 808 may be implemented as a processor, circuit, and/or instructions 806 stored in the memory 804 and executed by the processor 802. In some examples, the beamforming module 808 can be integrated within the modem subsystem 812. For example, the beamforming module 808 can be implemented by a combination of software components (e.g., executed by a DSP or a general processor) and hardware components (e.g., logic gates and circuitry) within the modem subsystem 812.

The beamforming module 808 may be used for various aspects of the present disclosure, for example, aspects of FIG. 1 to receive UL communications from the UE 702 transmit DL communications to the UE 700. The beamforming module 808 can be configured to determine an appropriate beam for DL communications as well as to determine an appropriate beam for UL communications. In some instances, the beamforming module 808 may configure the UE 700 for a particular beam, and after the UE 700 determines that a different beam direction is more appropriate, the UE 700 may send a message to the beamforming module 808 to request configuration for a different beam to implement the beamforming operations disclosed herein. Alternatively, the UE 700 may determine an appropriate beam configuration on its own to implement the beamforming techniques disclosed herein. Similarly, the beamforming module 808 and the beamforming module 708 may negotiate together to determine appropriate UL beams and or DL beams.

As shown, the transceiver 810 may include the modem subsystem 812 and the RF unit 814. The transceiver 810 can be configured to communicate bi-directionally with other devices, such as the UEs 115 and/or 700 and/or another core network element. The modem subsystem 812 may be configured to modulate and/or encode data according to a MCS (e.g., a LDPC coding scheme, a turbo coding scheme, a convolutional coding scheme, a digital beamforming scheme, etc.). The RF unit 814 may be configured to process (e.g., perform analog to digital conversion or digital to analog conversion, etc.) modulated/encoded data (e.g., PDCCH signals, RRC signals, MAC CE signals, PDSCH signals, etc.) from the modem subsystem 812 (on outbound transmissions) or of transmissions originating from another source, such as a UE 115 or 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, (e.g., data packets or, more generally, data messages that may contain one or more data packets and other information) to the antennas 816 for transmission to one or more other devices. This may include, for example, transmission of information to a UE 115 or 700 according to aspects of the present disclosure. The antennas 816 may further receive data messages transmitted from other devices and provide the received data messages for processing and/or demodulation at the transceiver 810. The transceiver 810 may provide the demodulated and decoded data (e.g., RACH message(s), ACK/NACKs for PDCCH signals, UL data, ACK/NACKs for DL data, etc.) to processor 802 for processing. The antennas 816 may include multiple antennas of similar or different designs in order to sustain multiple transmission links.

In an embodiment, the BS 800 can include multiple transceivers 810 implementing different RATs (e.g., NR and LTE). In an embodiment, the BS 800 can include a single transceiver 810 implementing multiple RATs (e.g., NR and LTE). In an embodiment, the transceiver 810 can include various components, where different combinations of components can implement different RATs.

Figure 9:
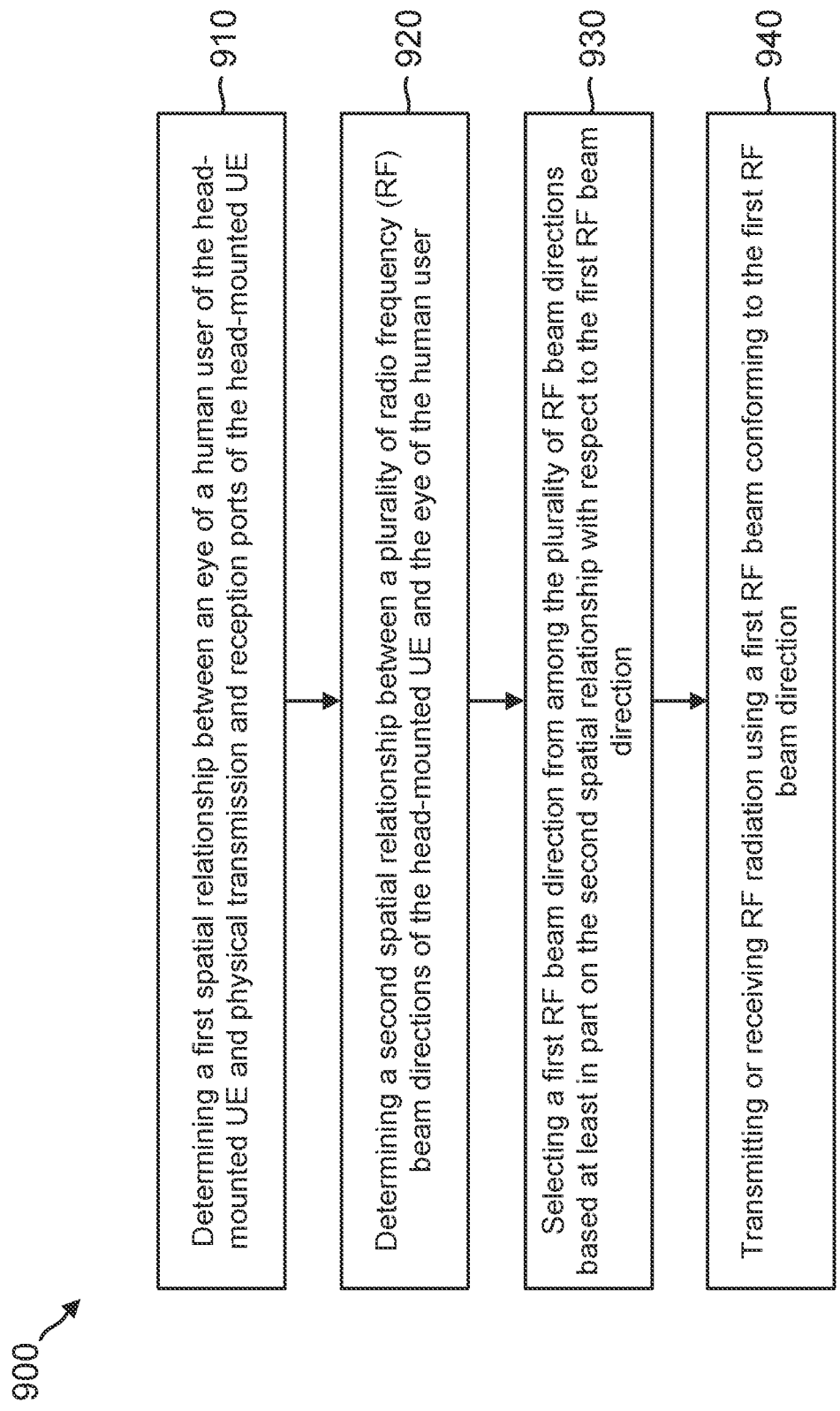
FIG. 9 illustrates a flow diagram of a wireless communication method according to some embodiments of the present disclosure.

FIG. 9 is an illustration of example method 900 for wireless communication by a head-mounted UE, according to various implementations. Method 900 may be performed, e.g., by a processor executing hardware or software logic to perform the functions of FIG. 9. For instance, an application running on an operating system, which runs on a processor may cooperate with a modem chipset to provide the functionality of FIG. 9. Additionally or alternatively, the operating system may coordinate with the modem chipset to provide the functionality of FIG. 9. The scope of implementations is not limited to any one component or any particular set of components within the UE. To the extent that communication is performed among cooperating components to, e.g., pass information relevant to spatial relationships, such communications may be performed using defined APIs.

At action 910, the UE determines a first spatial relationship between an eye of a human user of the head-mounted UE and physical transmission and reception ports of the head-mounted UE. An example as described above with respect to FIG. 4, wherein the system uses sensor 411 to determine a spatial relationship between the eye 452 and the antenna array 412. In other examples, the system may use an approximation or a default value for the spatial relationship. An example of transmission and reception ports includes antenna array 412, though the scope of implementations may include determining a spatial relationship with some other part of the UE, such as a center of the UE, a portion of the display screen of the UE, and/or the like.

Information regarding the first spatial relationship is not limited to, but may include, a position of the eye with respect to a display screen of the UE, a position of the eye with respect to a point within a removable handset within the UE, a position of a head of the human user with respect to a point within the removable handset within the UE, and the like. In an instance in which such information is gathered by an application running on an operating system of the UE, the application may pass such information to the operating system and/or to a modem chipset using one or more APIs. The first spatial relationship may include an angle of the eye and a distance of the pupil of the eye to the display screen or an antenna array.

Although action 910 is directed toward the spatial relationship between the eye and the UE, the scope of implementations is not so limited. Rather, various implementations may determine a spatial relationship between any human tissue and any relevant portion of the UE. For instance, brain tissue, nasal tissue, and the like may also be taken into consideration and the other actions performed to reduce exposure of that tissue.

Action 920 includes determining a second spatial relationship between a plurality of RF beam directions and the eye of the human user. The second spatial relationship may be derivable from the first spatial relationship and from other information regarding beamforming. Some UEs may have detailed information regarding beamforming directions, and that information may be processed with the first spatial relationship to determine whether certain beam directions cause more or less radiation exposure to sensitive tissues than other beam directions. Examples are shown above with respect to FIGS. 4-6, wherein exposure of the eye itself or direct exposure of the retina may be taken into account when determining the second spatial relationship.

At action 930, the UE selects a first RF beam direction from among the plurality of RF beam directions based at least in part of the second spatial relationship with respect to the first RF beam direction. In other words, the UE selects a first RF beam direction based upon a determined or approximate estimate of RF exposure of the eye based upon the second spatial relationship. As noted above, some beam directions may be associated with more or less RF exposure of sensitive tissues than are other beam directions. The UE may then select a particular beam direction to, e.g., reduce exposure of the retina of the eye to a back lobe or a side lobe that is associated with the particular beam direction. In selecting the RF beam direction, the UE may set as a constraint continued connectivity with the BS and then attempt to reduce or minimize RF exposure to sensitive tissues. For instance, there may be a plurality of beam directions in which connectivity to the BS is maintained, though some of those directions may be estimated to have less radiation exposure, and one of those directions estimated to have less radiation exposure may then be selected; the UE may disregard those beam directions having no connectivity or very poor connectivity regardless of estimated radiation exposure.

Furthermore, the beam direction may be selected with negotiations with the BS. Specifically, in some networks, the BS may configure a beam direction for the UE. However, the UE may perform calculations to determine appropriate beam directions. In such instances, the UE may suggest appropriate beam directions to the BS or may simply select one or more appropriate beam directions on its own regardless of configuration by the BS.

Beam directions may be selected in a number of ways. For instance, a UE may have a pre-programmed number of beams which it can use, and it may select from among those beams using the criteria discussed above (e.g., maintaining connectivity and reducing radiation exposure to sensitive tissues). In other examples, single or multiple beams may be steered in angular increments that are based on a beam steering codebook or other resource. In any event, the UE selects the beam direction by using either or both of selecting a particular beam and selecting an angle for a particular beam. Once again, action 930 may include selecting the beam direction based on the power and direction of a back lobe or side lobe, rather than the main beam. In fact, action 930 may include determining positions of side lobes or back lobes and then selecting the beam direction in response thereto.

Action 940 includes transmitting or receiving RF radiation using a first RF beam conforming to the first RF beam direction. For instance, the UE may transmit on the UL according to the selected beam direction. In other embodiments, the UE may negotiate with the BS for reception on the DL, and the UE may then receive on that DL according to the beam direction. For instance, in an example that conforms the DL, the UE may provide feedback to the BS so that the BS can then determine the direction for the DL beam. The UE may track the location of the eye or other sensitive tissues with respect to the beams from the BS or with respect to the BS itself and then select a DL beam direction to reduce or minimize RF exposure to sensitive tissues. The UE may then provide feedback to the BS regarding beam direction selection. One difference between DL and UL is that exposure to the user may typically be expected to result mostly from sidelobes and back lobes on the UL, whereas the main beam may provide the most exposure on the DL. Therefore, conforming the DL may usually involve reducing main beam exposure to sensitive tissues, though the scope of embodiments also includes conforming DL sidelobes and back lobes as appropriate.

The scope of implementations is not limited to the particular actions 910-940 of FIG. 9. Rather, other embodiments may add, omit, modify, or rearrange one or more actions. For instance, the UE may perform actions 910-940 multiple times and periodically in response to any appropriate condition, such as changing user position that might lend itself to using a different beam. As noted above, beamforming may be dynamic, and actions 910-940 may be performed as appropriate, such as each time a beam fails or a new beam is selected.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Examples of the present disclosure may include the following clauses:

1. A method for wireless communication performed by a head-mounted user equipment (UE), the method comprising:

determining a first spatial relationship between an eye of a human user of the head-mounted UE and physical transmission and reception ports of the head-mounted UE;
based on the first spatial relationship, determining a second spatial relationship between a plurality of radio frequency (RF) beam directions of the head-mounted UE and the eye of the human user;
selecting a first RF beam direction from among the plurality of RF beam directions based at least in part on the second spatial relationship with respect to the first RF beam direction; and
transmitting or receiving RF radiation using a first RF beam conforming to the first RF beam direction.

2. The method of clause 1, wherein selecting the first RF beam direction comprises:
selecting the first RF beam from a plurality of RF beams, each RF beam of the plurality of RF beams having a different direction.

3. The method of clause 1, wherein selecting the first RF beam direction comprises:
selecting the first RF beam direction within a continuous range that includes the plurality of RF beam directions.

4. The method of clauses 1-3, wherein the second spatial relationship takes into account exposure of a retina of the eye to the RF radiation, and wherein the first RF beam direction is selected based at least in part on the exposure of the retina of the eye to the RF radiation.

5. The method of clause 4, wherein the first RF beam direction is selected to minimize an amount of the exposure of the retina of the eye to the RF radiation.

6. The method of clauses 1-5, wherein determining the first spatial relationship further comprises:
passing information from an application running on an operating system of the head-mounted UE to the operating system of the head-mounted UE, the information including an indication selected from a list consisting of:
a position of the eye with respect to a display screen of the head-mounted UE;
a position of the eye with respect to a point within a removable handset within the head-mounted UE; and
a position of a head of the human user with respect to the point within the removable handset within the head-mounted UE.

7. The method of clause 6, wherein passing the information is performed in accordance with an application programming interface (API) defined between the application and the operating system.

8. The method of clause 6, wherein the position of the eye with respect to the display screen includes one or both of an angle of the eye and a distance of a pupil of the eye to the display screen, wherein the method further includes determining the position of the eye with respect to the display screen according to an optical sensor viewing the eye.

9. The method of clause 6, wherein the position of the eye with respect to the point includes one or both of an angle of the eye and a distance of a pupil of the eye to the point, wherein the method further includes determining the position of the eye with respect to the display screen according to an optical sensor viewing the eye.

10. The method of clause 6, wherein the first spatial relationship is determined based at least upon a scene displayed by the head-mounted UE.

11. The method of clauses 1-10, wherein selecting the first RF beam direction comprises:
determining a position of a side lobe of the first RF beam; and
selecting the first RF beam direction based at least in part on the position of the side lobe.

12. The method of clauses 1-11, further comprising:
selecting a power for the first RF beam based at least in part on the second spatial relationship.

13. The method of clauses 1-12, wherein the second spatial relationship comprises an angular relationship between the first RF beam and the eye.

14. The method of clause 13, wherein the second spatial relationship further comprises additional angular relationships between a plurality of side lobes of the first RF beam and the eye.

15. The method of clause 14, wherein the first RF beam direction is selected at an angle within the angular relationship and the additional angular relationships to affect exposure of the eye to the first RF beam and the plurality of side lobes.

16. The method of clauses 1-15, wherein the second spatial relationship takes into account RF attenuation attributable to physical portions of the head-mounted UE.

17. The method of clauses 1-16, wherein the first spatial relationship is determined by an application running on the head-mounted UE, and wherein the second spatial relationship is determined by an operating system of the head-mounted UE, wherein the method further comprises:
sending data from the application to the operating system according to an application programming interface (API), wherein the data indicates the first spatial relationship.

18. An extended reality (XR) device, comprising:
a modem configured to transmit and receive radio frequency (RF) signals; and
a processor configured to control the modem and to perform a process including:
determining a spatial relationship between a first lobe within a beam pattern and tissue of a human user of the XR device;
selecting a direction for the beam pattern based on the spatial relationship; and
transmitting the RF signals using the beam pattern in the direction.

19. The XR device of clause 18, wherein the first lobe comprises a side lobe.

20. The XR device of clause 18, wherein the first lobe comprises a back lobe.

21. The XR device of clauses 18-20, wherein the processor is configured to determine the spatial relationship based at least in part on an angle of an eye of the human user.

22. The XR device of clause 21, wherein the processor is configured to select the direction for the beam pattern to avoid exposure of a retina of the eye to the first lobe through a pupil of the eye.

23. An extended reality (XR) device, comprising:
means for determining a spatial relationship between a side lobe or a back lobe of a beam pattern and a retina of a human user of the XR device;

means for determining potential radiation exposure from the side lobe or the back lobe to the retina for a plurality of directions of the beam pattern;
means for selecting a first direction of the beam pattern based on the potential radiation exposure; and
means for transmitting data using the beam pattern according to the first direction in communication with a base station (BS) serving the XR device.

24. The XR device of clause 23, wherein the means for selecting the first direction further includes means for setting a power of the beam pattern based at least in part on the potential radiation exposure.

25. The XR device of clauses 23-24, comprising a head-mountable portion configured to have a data connection to a user equipment (UE) and configured to fit the UE within the head-mountable portion.

26. The XR device of clauses 23-24, comprising goggles having an integrated wireless chipset that includes the means for determining the spatial relationship, the means for determining potential radiation exposure, the means for selecting the first direction, and the means for transmitting data.

27. A non-transitory computer-readable medium having program code recorded thereon for wireless communication by a wireless communication device, the program code comprising:
code for processing information regarding a physical position of an antenna array of the wireless communication device, information regarding beam pattern direction of the antenna array, and information regarding a position of tissues of a human user, wherein the processing provides information indicating a spatial relationship between the tissues of the human user and a side lobe or a back lobe of a beam pattern for multiple directions;
code for determining potential radiation exposure by the side lobe or the back lobe to the tissues of the human user for each of the multiple directions;
code for selecting a first direction of the multiple directions for the side lobe or the back lobe, the first direction being selected according to at least a first constraint to maintain connectivity with a base station (BS) serving the wireless communication device and at least a second constraint to minimize radiation exposure to the tissues of the human user; and
code for causing a transceiver of the wireless communication device to communicate data to the BS using the beam pattern and according to the first direction.

28. The non-transitory computer-readable medium of clause 27, further comprising:
code for determining the potential radiation exposure by accounting for an angle of an eye of the human user.

29. The non-transitory computer-readable medium of clauses 27-28, further comprising:
code for determining the potential radiation exposure by accounting for a position of a brain of the human user.

30. The non-transitory computer-readable medium of clauses 27-29, wherein the code for selecting the first direction comprises an item selected from a list consisting of:
code for selecting from among a plurality of pre-programmed millimeter wave main beams; and
code for selecting from a range of angular steps for a main beam.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication performed by a head-mounted user equipment (UE), the method comprising:
determining a first spatial relationship between an eye of a human user of the head-mounted UE and physical transmission and reception ports of the head-mounted UE;
based on the first spatial relationship, determining a second spatial relationship between a plurality of radio frequency (RF) beam directions of the head-mounted UE and the eye of the human user;
selecting a first RF beam direction from among the plurality of RF beam directions based at least in part on the second spatial relationship with respect to the first RF beam direction; and
transmitting or receiving RF radiation using a first RF beam conforming to the first RF beam direction.

2. The method of claim 1, wherein selecting the first RF beam direction comprises:
selecting the first RF beam from a plurality of RF beams, each RF beam of the plurality of RF beams having a different direction.

3. The method of claim 1, wherein selecting the first RF beam direction comprises:
selecting the first RF beam direction within a continuous range that includes the plurality of RF beam directions.

4. The method of claim 1, wherein the second spatial relationship takes into account exposure of a retina of the eye to the RF radiation, and wherein the first RF beam direction is selected based at least in part on the exposure of the retina of the eye to the RF radiation.

5. The method of claim 4, wherein the first RF beam direction is selected to minimize an amount of the exposure of the retina of the eye to the RF radiation.

6. The method of claim 1, wherein determining the first spatial relationship further comprises:
passing information from an application running on an operating system of the head-mounted UE to the operating system of the head-mounted UE, the information including an indication selected from a list consisting of:
a position of the eye with respect to a display screen of the head-mounted UE;
a position of the eye with respect to a point within a removable handset within the head-mounted UE; and
a position of a head of the human user with respect to the point within the removable handset within the head-mounted UE.

7. The method of claim 6, wherein passing the information is performed in accordance with an application programming interface (API) defined between the application and the operating system.

8. The method of claim 6, wherein the position of the eye with respect to the display screen includes one or both of an angle of the eye and a distance of a pupil of the eye to the display screen, wherein the method further includes determining the position of the eye with respect to the display screen according to an optical sensor viewing the eye.

9. The method of claim 6, wherein the position of the eye with respect to the point includes one or both of an angle of the eye and a distance of a pupil of the eye to the point, wherein the method further includes determining the position of the eye with respect to the display screen according to an optical sensor viewing the eye.

10. The method of claim 6, wherein the first spatial relationship is determined based at least upon a scene displayed by the head-mounted UE.

11. The method of claim 1, wherein selecting the first RF beam direction comprises:
determining a position of a side lobe of the first RF beam; and
selecting the first RF beam direction based at least in part on the position of the side lobe.

12. The method of claim 1, further comprising:
selecting a power for the first RF beam based at least in part on the second spatial relationship.

13. The method of claim 1, wherein the second spatial relationship comprises an angular relationship between the first RF beam and the eye.

14. The method of claim 13, wherein the second spatial relationship further comprises additional angular relationships between a plurality of side lobes of the first RF beam and the eye.

15. The method of claim 14, wherein the first RF beam direction is selected at an angle within the angular relationship and the additional angular relationships to affect exposure of the eye to the first RF beam and the plurality of side lobes.

16. The method of claim 1, wherein the second spatial relationship takes into account RF attenuation attributable to physical portions of the head-mounted UE.

17. The method of claim 1, wherein the first spatial relationship is determined by an application running on the head-mounted UE, and wherein the second spatial relationship is determined by an operating system of the head-mounted UE, wherein the method further comprises:
sending data from the application to the operating system according to an application programming interface (API), wherein the data indicates the first spatial relationship.

18. An extended reality (XR) device, comprising:
a modem configured to transmit and receive radio frequency (RF) signals; and
a processor configured to control the modem and to perform a process including:
determining a spatial relationship between a first lobe within a beam pattern and tissue of a human user of the XR device;
selecting a direction for the beam pattern based on the spatial relationship; and
transmitting the RF signals using the beam pattern in the direction.

19. The XR device of claim 18, wherein the first lobe comprises a side lobe.

20. The XR device of claim 18, wherein the first lobe comprises a back lobe.

21. The XR device of claim 18, wherein the processor is configured to determine the spatial relationship based at least in part on an angle of an eye of the human user.

22. The XR device of claim 21, wherein the processor is configured to select the direction for the beam pattern to avoid exposure of a retina of the eye to the first lobe through a pupil of the eye.

23. An extended reality (XR) device, comprising:
means for determining a spatial relationship between a side lobe or a back lobe of a beam pattern and a retina of a human user of the XR device;
means for determining potential radiation exposure from the side lobe or the back lobe to the retina for a plurality of directions of the beam pattern;
means for selecting a first direction of the beam pattern based on the potential radiation exposure; and
means for transmitting data using the beam pattern according to the first direction in communication with a base station (BS) serving the XR device.

24. The XR device of claim 23, wherein the means for selecting the first direction further includes means for setting a power of the beam pattern based at least in part on the potential radiation exposure.

25. The XR device of claim 23, comprising a head-mountable portion configured to have a data connection to a user equipment (UE) and configured to fit the UE within the head-mountable portion.

26. The XR device of claim 23, comprising goggles having an integrated wireless chipset that includes the means for determining the spatial relationship, the means for determining potential radiation exposure, the means for selecting the first direction, and the means for transmitting data.

27. A non-transitory computer-readable medium having program code recorded thereon for wireless communication by a wireless communication device, the program code comprising:
code for processing information regarding a physical position of an antenna array of the wireless communication device, information regarding beam pattern direction of the antenna array, and information regarding a position of tissues of a human user, wherein the code for processing includes code for indicating a spatial relationship between the tissues of the human user and a side lobe or a back lobe of a beam pattern for multiple directions;
code for determining potential radiation exposure by the side lobe or the back lobe to the tissues of the human user for each of the multiple directions;
code for selecting a first direction of the multiple directions for the side lobe or the back lobe, the first direction being selected according to at least a first constraint to maintain connectivity with a base station (BS) serving the wireless communication device and at least a second constraint to minimize radiation exposure to the tissues of the human user; and
code for causing a transceiver of the wireless communication device to communicate data to the BS using the beam pattern and according to the first direction.

28. The non-transitory computer-readable medium of claim 27, further comprising:
code for determining the potential radiation exposure by accounting for an angle of an eye of the human user.

29. The non-transitory computer-readable medium of claim 27, further comprising:
code for determining the potential radiation exposure by accounting for a position of a brain of the human user.

30. The non-transitory computer-readable medium of claim 27, wherein the code for selecting the first direction comprises an item selected from a list consisting of:

code for selecting from among a plurality of pre-programmed millimeter wave main beams; and code for selecting from a range of angular steps for a main beam.

* * * * *